(12) United States Patent
Army et al.

(10) Patent No.: US 10,689,121 B2
(45) Date of Patent: Jun. 23, 2020

(54) HEAT EXCHANGER WITH EXTERNAL PLENUM

(71) Applicant: Hamilton Sundstrand Corporation, Charlotte, NC (US)

(72) Inventors: Donald E. Army, Enfield, CT (US); Frederick Peacos, III, North Scituate, RI (US)

(73) Assignee: Hamilton Sundstrand Corporation, Charlotte, NC (US)

(*) Notice: Subject to any disclaimer, the term of this patent is extended or adjusted under 35 U.S.C. 154(b) by 99 days.

(21) Appl. No.: 15/879,192

(22) Filed: Jan. 24, 2018

(65) Prior Publication Data

US 2019/0225345 A1    Jul. 25, 2019

(51) Int. Cl.
| | |
|---|---|
| *B64D 13/08* | (2006.01) |
| *F28F 9/26* | (2006.01) |
| *F28D 9/00* | (2006.01) |
| *F28F 9/02* | (2006.01) |
| *B64D 13/06* | (2006.01) |
| *F28D 21/00* | (2006.01) |

(52) U.S. Cl.
CPC .......... *B64D 13/08* (2013.01); *F28D 9/0093* (2013.01); *F28F 9/0246* (2013.01); *F28F 9/26* (2013.01); *B64D 2013/0618* (2013.01); *F28D 2021/0021* (2013.01)

(58) Field of Classification Search
CPC .................................................. B64D 13/06; B64D 2013/0618; B64D 13/02; B64D 13/08; F28F 9/26; F28F 9/0246; F28D 9/0093
USPC .......................................................... 62/61
See application file for complete search history.

(56) References Cited

U.S. PATENT DOCUMENTS

| | | | |
|---|---|---|---|
| 3,513,907 A | 5/1970 | Hughes | |
| 5,918,472 A * | 7/1999 | Jonqueres | B64D 13/06 |
| | | | 62/172 |
| 6,128,909 A * | 10/2000 | Jonqueres | B64D 13/06 |
| | | | 62/402 |
| 7,849,702 B2 | 12/2010 | Parikh | |
| 2002/0121103 A1 | 9/2002 | Udobot et al. | |

(Continued)

FOREIGN PATENT DOCUMENTS

WO    WO2017/054087 A1    4/2017

OTHER PUBLICATIONS

Extended European Search Report for EP Application No. 19153524.4, dated Jun. 19, 2019, 7 pages.

*Primary Examiner* — Ana M Vazquez
(74) *Attorney, Agent, or Firm* — Kinney & Lange, P.A.

(57) ABSTRACT

An environmental control system assembly for an aircraft includes a heat exchanger assembly and a plenum. The heat exchanger assembly includes a first heat exchanger in fluid communication with a source of bleed air, a second heat exchanger disposed adjacent to the first, a third heat exchanger disposed adjacent to the second, and an end sheet. The first heat exchanger includes a first endwall, a first inlet header, a first outlet header, and a first endcap located on the first outlet header. The third heat exchanger includes a third endwall, a third inlet header connected to the third endwall, a third outlet header, and a third endcap located on the third inlet header. The end sheet includes the first, second, and third endwalls. The plenum fluidly connects the first outlet header of the first heat exchanger to the third inlet header of the third heat exchanger.

17 Claims, 11 Drawing Sheets

(56) References Cited

U.S. PATENT DOCUMENTS

| | | | |
|---|---|---|---|
| 2004/0177639 A1* | 9/2004 | Army, Jr. ............... | B64D 13/08 62/402 |
| 2014/0352348 A1* | 12/2014 | Army, Jr. ............. | B64D 13/006 62/401 |
| 2016/0161189 A1 | 6/2016 | Borghese et al. | |
| 2017/0268810 A1 | 9/2017 | Army et al. | |

* cited by examiner

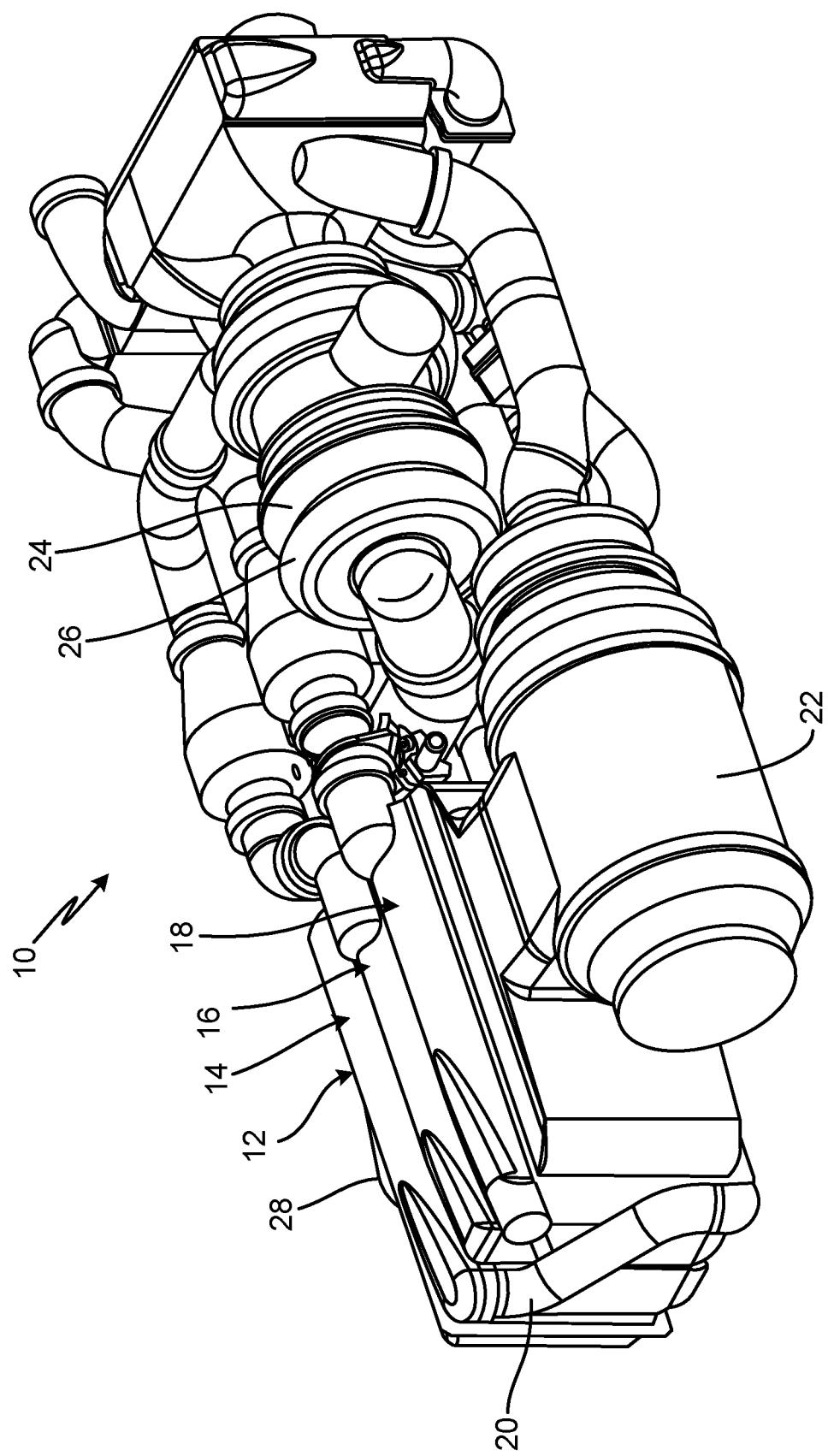

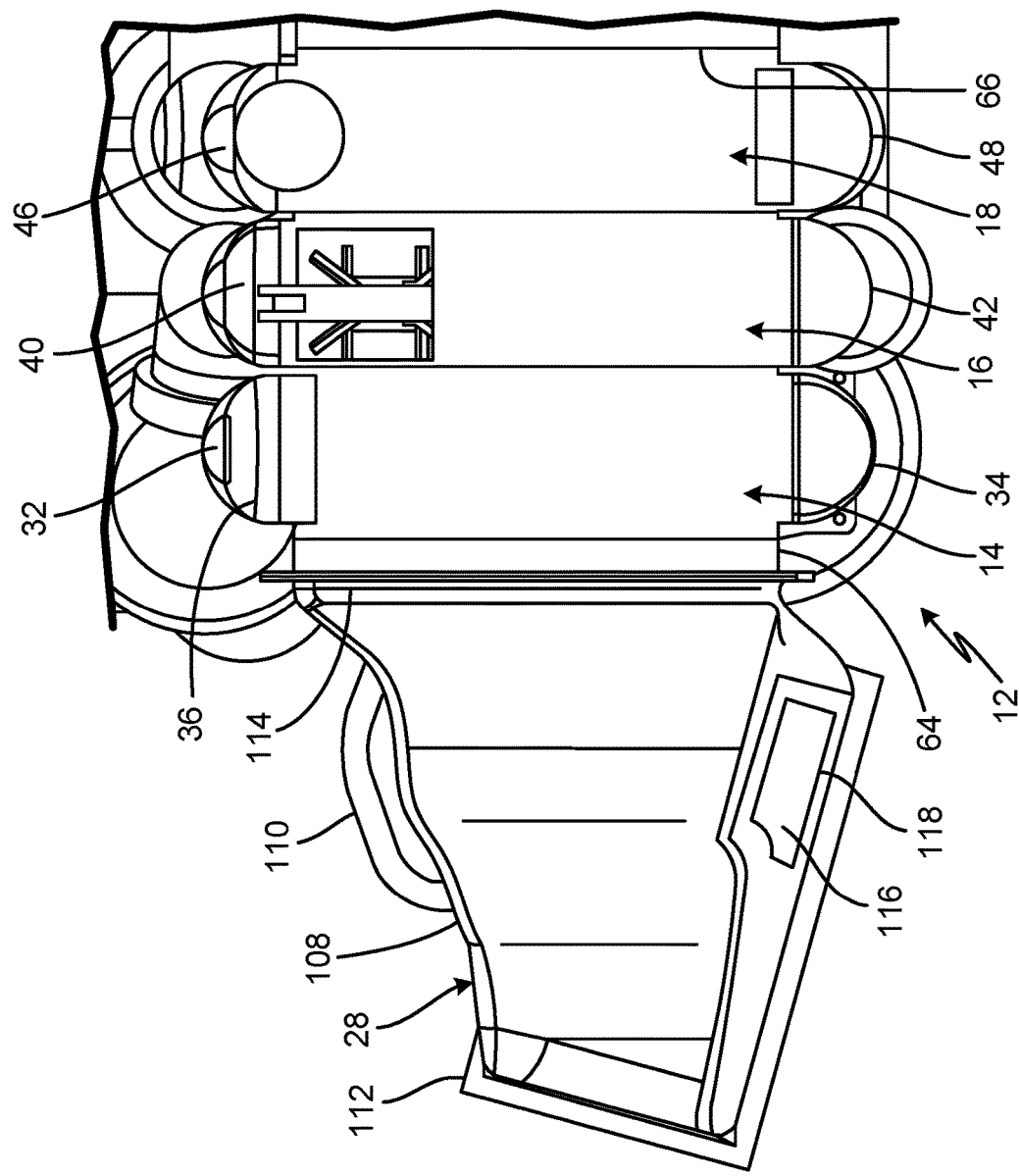

HEAT EXCHANGER WITH EXTERNAL PLENUM

BACKGROUND

The present disclosure relates to heat exchangers. More particularly, the present disclosure relates to a heat exchanger assembly for an environmental control system ("ECS") of an aircraft.

The ECS, including the ram air fan assembly, aboard an aircraft provides conditioned air to an aircraft cabin. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

SUMMARY

An environmental control system assembly for an aircraft includes a heat exchanger assembly and a plenum. The heat exchanger assembly includes a first heat exchanger in fluid communication with a source of bleed air from the engine, a second heat exchanger disposed adjacent to the first heat exchanger, a third heat exchanger disposed adjacent to the second heat exchanger, and an end sheet disposed along an end of the heat exchanger assembly. The first heat exchanger includes a first endwall, a first inlet header, a first outlet header connected to the first endwall, and a first endcap located on the first outlet header. The second heat exchanger includes a second endwall. The third heat exchanger includes a third endwall, a third inlet header connected to the third endwall, a third outlet header, and a third endcap located on the third inlet header. The end sheet includes the first, second, and third endwalls. The plenum fluidly connects the first outlet header of the first heat exchanger to the third inlet header of the third heat exchanger.

A method of managing a fluid with a heat exchanger assembly includes passing air into a bleed air heat exchanger of the heat exchanger assembly. The air is drawn out of the bleed air heat exchanger, through an outlet header of the bleed air heat exchanger, and into a plenum. The outlet header of the bleed air heat exchanger fluidly connects the bleed air heat exchanger to the plenum. The plenum is attached to an end sheet of the heat exchanger assembly along an entire length of the plenum. The air is passed through the plenum. The air is drawn from the plenum, through an inlet header of a chiller heat exchanger, and into the chiller heat exchanger. The inlet header of the chiller heat exchanger fluidly connects the plenum to the chiller heat exchanger.

An environmental control system includes a heat exchanger assembly, an end sheet, and a semi-circular plenum welded along its length to the end sheet. The heat exchanger assembly includes a chiller heat exchanger, a fresh air heat exchanger, and a bleed air heat exchanger. The chiller heat exchanger includes a chiller endwall, a chiller inlet header mounted on the top of the chiller heat exchanger, a chiller outlet header mounted on the bottom of the chiller heat exchanger, and a chiller endcap attached and in fluid communication with the chiller inlet header. The fresh air heat exchanger is mounted adjacent to the chiller heat exchanger. The fresh air heat exchanger includes a fresh air endwall. A fresh air inlet header is mounted on the top of the fresh air heat exchanger, and a fresh air outlet header mounted on the bottom of the fresh air heat exchanger. The bleed air heat exchanger is mounted adjacent to the fresh air heat exchanger. The bleed air heat exchanger includes a bleed air endwall, a bleed air inlet header mounted on the top of the bleed air heat exchanger, a bleed air outlet header mounted on the bottom of the bleed air heat exchanger, and a bleed air endcap attached and in fluid communication with the bleed air inlet header. The end sheet includes the chiller, fresh air, and bleed air endwalls. The semi-circular plenum fluidly connects the bleed air outlet header to the chiller inlet header.

BRIEF DESCRIPTION OF THE DRAWINGS

FIG. 1A is a perspective view of an ECS pack with a heat exchanger assembly.

FIG. 7B is an end view of the inlet plenum and the heat exchanger assembly.

DETAILED DESCRIPTION

Figure 1B:
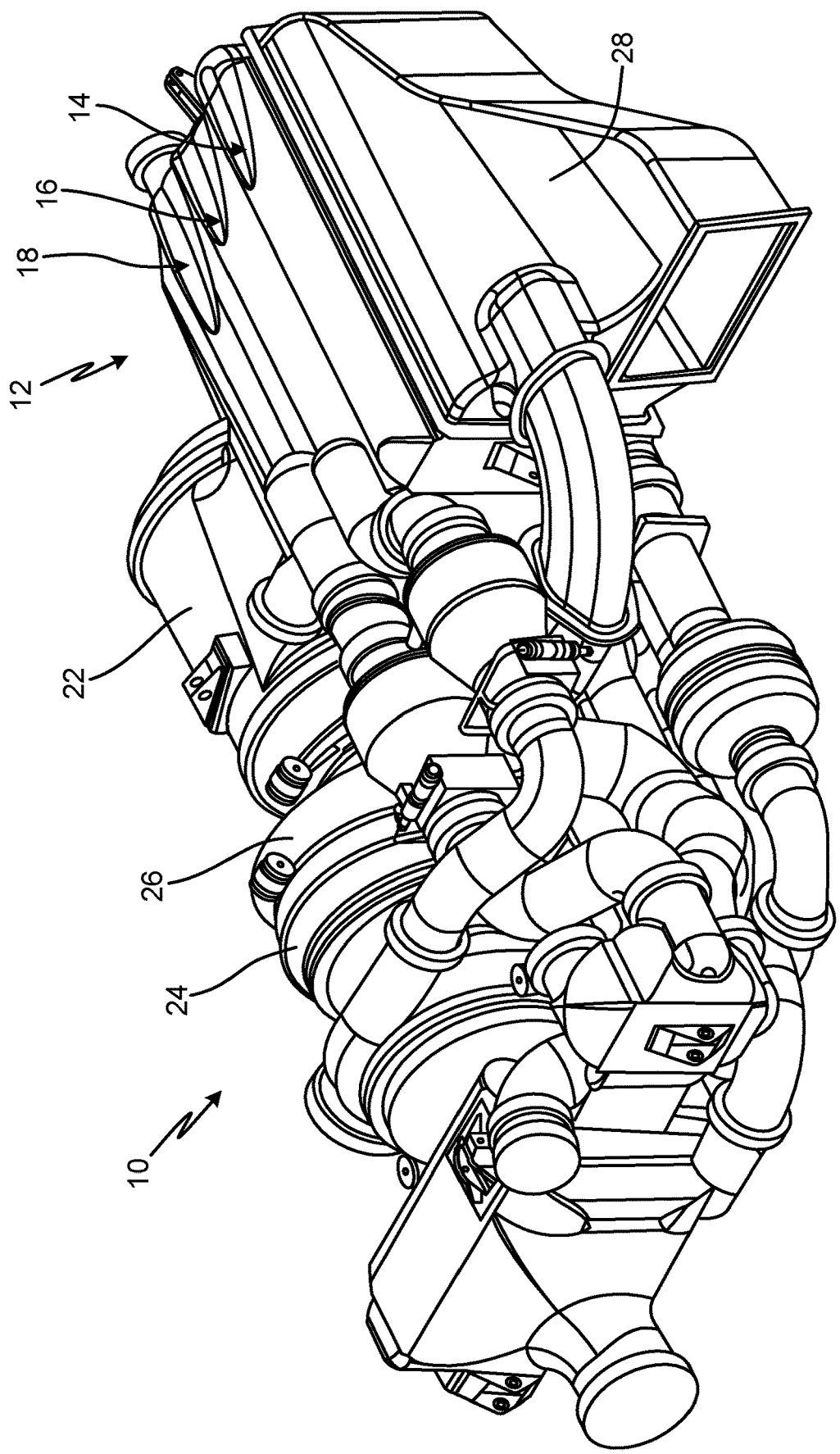
FIG. 1B is another perspective view of the ECS pack with an inlet plenum.

FIG. 1A is a perspective view of ECS pack 10 with heat exchanger assembly 12 and shows ECS pack 10, heat exchanger assembly 12 (with chiller heat exchanger 14, fresh air heat exchanger 16, and bleed air heat exchanger 18), external plenum 20, FIDH 22 (fan inlet diffuser housing), ACM 24 (air cycle machine), and power turbine 26. FIG. 1B is another perspective view of ECS pack 10 and shows ECS pack 10, heat exchanger assembly 12 (with chiller heat exchanger 14, fresh air heat exchanger 16, and bleed air heat exchanger 18), fan inlet diffuser housing 22, ACM 24 (air cycle machine), power turbine 26, and inlet plenum 28. FIGS. 1A and 1B show the same or similar elements and will be discussed in unison.

ECS pack 10 is an environmental control system. In this non-limiting embodiment, ECS pack 10 is an environmental control system for an aircraft. Heat exchanger assembly 12 is an assembly of three heat exchanger units. Chiller heat exchanger 14, fresh air heat exchanger 16, and bleed air heat exchanger 18 are heat exchangers each with a plurality of fins for transferring thermal energy between the fins and a fluid. External plenum 20 is a semi-circular pressure vessel. FIDH 22 is a fan inlet diffuser housing. ACM 24 is an air cycle machine. Power turbine 26 is a rotary device including a component configured to create power by rotating in response to a fluid flowing through power turbine 26. Inlet plenum 28 is an inlet housing or conduit. As will be discussed with respect to FIGS. 7A through 8B, inlet plenum 28 includes two inlets and one outlet.

ECS pack 10 is mounted within a portion of an aircraft. ECS pack 10 is fluidly connected to numerous fluid sources such as an engine, an auxiliary power unit, a source of ambient air, a cabin, a cockpit, and/or a source of ram air of the aircraft. Heat exchanger assembly 12 is mounted within a portion of ECS pack 10. Chiller heat exchanger 14 is disposed adjacent to and in contact with fresh air heat exchanger 16. Chiller heat exchanger 14 is fluidly connected to a bleed turbine (not shown) of ECS pack 10 and to bleed air heat exchanger 18 via external plenum 20. Chiller heat exchanger 14 is also fluidly connected to inlet plenum 28 via a cold circuit of heat exchanger assembly 12 that passes through each of chiller heat exchanger 14, fresh air heat exchanger 16, and bleed air heat exchanger 18 (as will be discussed with respect to FIG. 3A).

Fresh air heat exchanger 16 is disposed adjacent to and in contact with chiller heat exchanger 14 and bleed air heat exchanger 18. Fresh air heat exchanger 16 is fluidly connected to a fresh air compressor (not shown) and to a condenser re-heater (not shown) of ECS pack 10. Bleed air heat exchanger 18 is disposed adjacent to and in contact with fresh air heat exchanger 16 and FIDH 22. Bleed air heat exchanger 18 is fluidly connected to a bleed outflow heat exchanger (not shown) and to chiller heat exchanger 14 of ECS pack 10. External plenum 20 is mounted to end portions of chiller heat exchanger 14, fresh air heat exchanger 16, and bleed air heat exchanger 18.

FIDH 22 is mounted to a side of bleed air heat exchanger 18 and to a turbo fan (not shown) of ECS pack 10. FIDH 22 is fluidly connected to the cold ram air circuit that passes through heat exchanger assembly 12. In other non-limiting embodiments, FIDH 22 can be replaced with another component or removed all together from ECS pack 10. ACM 24 is physically and fluidly connected to power turbine 26. Power turbine 26 is mounted to a portion of ACM 24 and is fluidly connected to ACM 24 and to inlet plenum 28. Inlet plenum 28 is mounted to chiller heat exchanger 14 via a picture frame flange interface with a flange the shape of a picture frame extending from both plenum 28 and chiller heat exchanger 14. Inlet plenum 28 is fluidly connected to chiller heat exchanger 14, to a source of ram air, and to power turbine 26.

ECS pack 10 controls and manages the transfer of thermal energy and pressures among the different sources of air throughout the aircraft. Heat exchanger assembly 12 (with chiller heat exchanger 14, fresh air heat exchanger 16, and bleed air heat exchanger 18) functions to cool the air flowing through each of chiller heat exchanger 14, fresh air heat exchanger 16, and bleed air heat exchanger 18. As will be discussed with respect to FIGS. 3A and 3B, heat exchanger assembly 12 includes three independent hot circuits that are in series cross flow communication with a single (cold) ram circuit.

External plenum 20 functions to transfer air from bleed air heat exchanger 18 to chiller heat exchanger 14. FIDH 22 functions to receive and transfer air away from the cold ram air circuit of heat exchanger assembly 12. ACM 24 functions as an air conditioning pack to change to the pressure, temperature, and/or humidity of air passing through ACM 24. Inlet plenum 28 receives cooling air from two separate sources and transfers that air into heat exchanger assembly 12. The two sources are ambient ram air and exhaust air from power turbine 26.

ECS pack 10 with heat exchanger assembly 12 provides a benefit of minimizing the overall installed volume of ECS pack 10 by eliminating picture frame flanges between hot passes that are often incorporated in existing heat exchanger assemblies. For example, in one embodiment, heat exchanger assembly 12 provides approximately a 4 inch reduction in a width of heat exchanger assembly 12 as compared to a heat exchanger assembly configuration including three separate heat exchangers bolted together in series. ECS pack 10 with heat exchanger assembly 12 reduces the amount of parts by combining three cross flow heat exchangers into a single assembly. Heat exchanger assembly 12 eliminates the need for intermediate ram flanges and seals, provides a lighter weight assembly, and reduces the amount of time necessary to assemble ECS pack 10. The configuration of heat exchanger assembly 12 also improves reliability of ECS pack 10 by reducing a number of seals and potential leak sources between each of chiller heat exchanger 14, fresh air heat exchanger 16, and bleed air heat exchanger 18.

Figure 2:
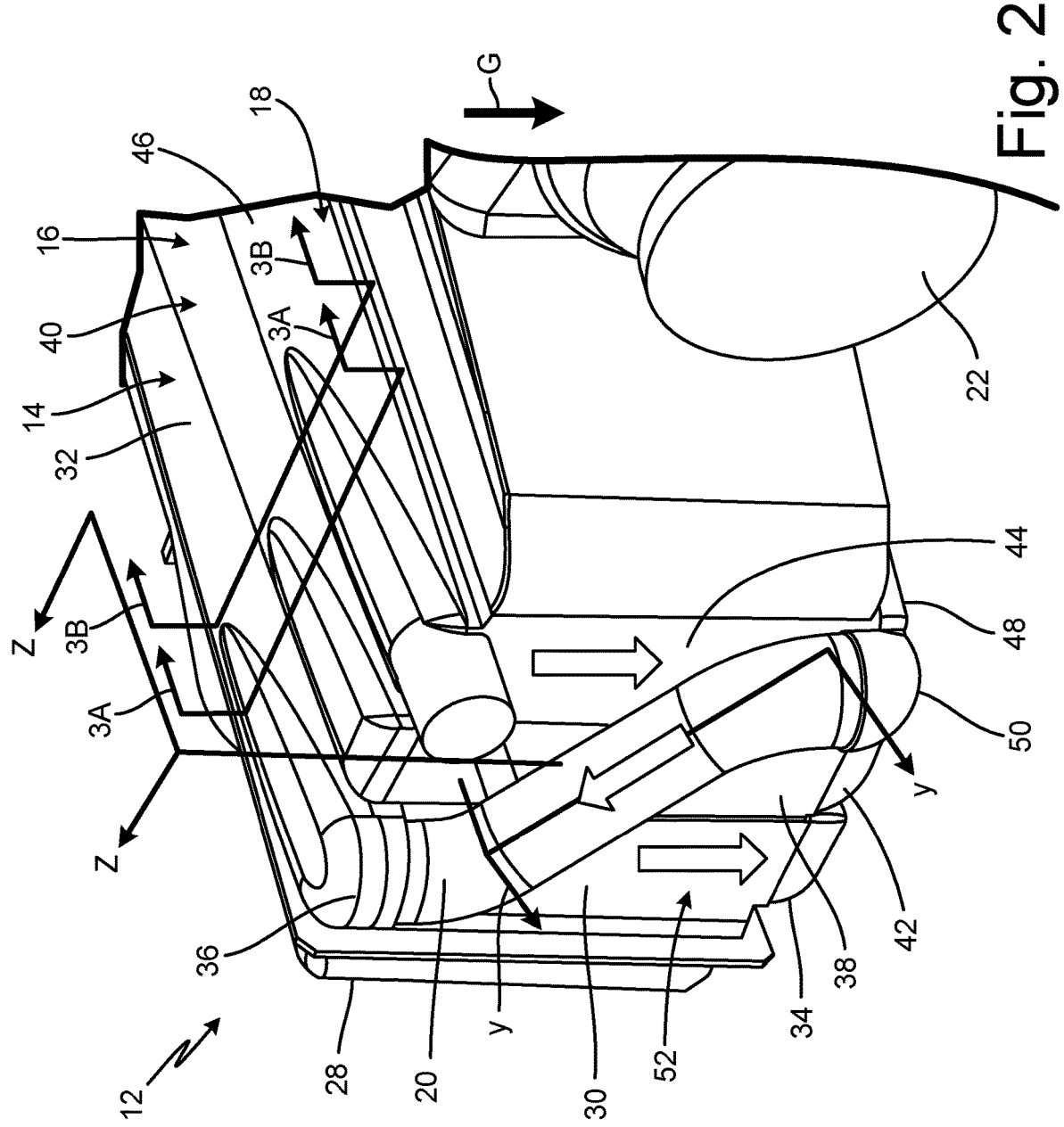
FIG. 2 is an enlarged perspective view of a portion of the heat exchanger assembly with a plenum.

FIG. 2 is an enlarged perspective view of a portion of ECS pack 10 and shows heat exchanger assembly 12, chiller heat exchanger 14 (with chiller endwall 30, chiller inlet header 32, chiller outlet header 34, and chiller endcap 36), fresh air heat exchanger 16 (with fresh air endwall 38, fresh air inlet header 40, and fresh air outlet header 42), bleed air heat exchanger 18 (with bleed air endwall 44, bleed air inlet header 46, bleed air outlet header 48, and bleed air endcap 50), external plenum 20, FIDH 22, inlet plenum 28, end sheet 52, and direction G of gravity.

Chiller endwall 30, fresh air endwall 38, and bleed air endwall 44 are walls or barriers of solid material. Chiller inlet header 32, chiller outlet header 34, fresh air inlet header 40, fresh air outlet header 42, bleed air inlet header 46, and bleed air outlet header 48 are approximately semi-circular pieces of solid material extending along a length. In one non-limiting embodiment, chiller endcap 36 and/or bleed air endcap 50 can be cast or hydro-formed pieces of solid material that include a bent, semi-circular shape. End sheet 52 is a wall or barrier of heat exchanger assembly 12. Direction G is a direction of gravity relative to ECS pack 10 (and heat exchanger assembly 12), illustrated in the example of FIG. 2 when the aircraft is level (e.g., on ground or in straight and level flight).

External plenum 20 is mounted to end sheet 52. In one non-limiting embodiment, external plenum 20 is welded to end sheet 52 with a fillet weld. External plenum 20 is connected to end sheet 52 so as to form a sealed conduit. Chiller endwall 30 is disposed on an end of chiller heat exchanger 14. Chiller inlet header 32 is disposed on a top side of chiller heat exchanger 14. Chiller inlet header 32 is fluidly connected to chiller heat exchanger 14 and to external plenum 20 via chiller endcap 36. Chiller outlet header 34 is disposed on a bottom side of chiller heat exchanger 14.

Chiller outlet header 34 is fluidly connected to chiller heat exchanger 14. Chiller endcap 36 is attached to a portion of chiller inlet header 32. Chiller endcap 36 is fluidly connected to chiller inlet header 32 and to external plenum 20.

Fresh air endwall 38 is disposed on an end of fresh air heat exchanger 16. Fresh air inlet header 40 is disposed on a top side of fresh air heat exchanger 16. Fresh air outlet header 42 is disposed on a bottom side of fresh air heat exchanger 16. Bleed air endwall 44 is disposed on an end of bleed air heat exchanger 18. Bleed air inlet header 46 is disposed on a top side of bleed air heat exchanger 18. Bleed air outlet header 48 is disposed on a bottom side of bleed air heat exchanger 18. Bleed air outlet header 48 is fluidly connected to bleed air heat exchanger 18 and to external plenum 20 via bleed air endcap 50. Bleed air endcap 50 is attached to a portion of bleed air outlet header 48. Bleed air endcap 50 is fluidly connected to bleed air heat exchanger 18 and to external plenum 20.

End sheet 52 is disposed on an end of heat exchanger assembly 12. End sheet 52 is formed by chiller endwall 30, fresh air endwall 38, and bleed air endwall 44. Direction G of gravity points in a downward direction in FIG. 2 (e.g., when the aircraft is level, such as in level flight or on-ground). Heat exchanger assembly 12, chiller heat exchanger 14, fresh air heat exchanger 16, and bleed air heat exchanger 18 are oriented relative to gravity as shown in FIG. 2.

The sealed conduit formed by external plenum 20 and end sheet 52 is configured to transport a fluid (such as air) from bleed air outlet header 48 of bleed air heat exchanger 18 to chiller inlet header 32 of chiller heat exchanger 14. Chiller endwall 30 confines and fluidly seals a portion of chiller heat exchanger 14. Chiller inlet header 32 is configured to receive air from bleed air outlet header 48 and transfer the air into chiller heat exchanger 14. Chiller outlet header 34 receives a flow of hot air passing through chiller heat exchanger 14. Chiller endcap 36 fluidly connects external plenum 20 to chiller inlet header 32.

Fresh air endwall 38 confines and fluidly seals a portion of fresh air heat exchanger 16. Fresh air inlet header 40 is configured to receive air from the fresh air compressor (not shown) and transfer the air into fresh air heat exchanger 16. Fresh air outlet header 42 is configured to receive air from fresh air heat exchanger 16 and transfer the air to the condenser re-heater (not shown) of ECS pack 10. Bleed air endwall 44 confines and fluidly seals a portion of bleed air heat exchanger 18. Bleed air inlet header 46 is configured to receive air from bleed outflow heat exchanger (not shown) and transfer the air into bleed air heat exchanger 18. Bleed air outlet header 48 is configured to receive air from bleed air heat exchanger 18 and transfer the air to chiller heat exchanger 14 vie external plenum 20. Bleed air endcap 50 fluidly connects external plenum 20 to a portion of bleed air outlet header 48.

End sheet 52 confines and fluidly seals a portion of heat exchanger assembly 12. End sheet 52 also transfers thermal energy between the air passing through external plenum 20 and end sheet 52. The orientation of ECS pack 10 and heat exchanger assembly 12 with respect to direction G of gravity functions to allow drainage of condensation and water in each of chiller heat exchanger 14, fresh air heat exchanger 16, and bleed air heat exchanger 18 in a downward direction and into chiller outlet header 34, fresh air outlet header 42, and bleed air outlet header 48, respectively. Though the example of FIG. 2 illustrates the direction G of gravity in a downward direction directly toward chiller outlet header 34, fresh air outlet header 42, and bleed air outlet header 48, it should be understood that the direction G of gravity will change relative to ECS pack 10 and heat exchanger assembly 12 as the aircraft attitude (i.e., roll, pitch, and/or yaw of the aircraft) changes. That is, as the roll, pitch, and/or yaw of the aircraft changes, the direction G of gravity will change relative to ECS pack 10 and heat exchanger assembly 12, but will continue to have a component in the downward direction (i.e., toward chiller outlet header 34, fresh air outlet header 42, and bleed air outlet header 48). Accordingly, even as the aircraft attitude changes during flight, the direction G of gravity has a component in the direction of flow of the hot air toward chiller outlet header 34, fresh air outlet header 42, and bleed air outlet header 48.

In existing heat exchanger assemblies with directions of flow not in the same direction as gravity, water tends to accumulate onto the fins of the heat exchangers. This build-up of water on the fins of the heat exchangers can cause functionality issues as well as outright failure of the heat exchangers or connected ACM of the system. ECS pack 10 with heat exchanger assembly 12 oriented to have directions of hot airflow in a same direction as gravity allows for any water attached to the fins of chiller heat exchanger 14, fresh air heat exchanger 16, and bleed air heat exchanger 18 to more easily flow into chiller outlet header 34, fresh air outlet header 42, and bleed air outlet header 48, respectively. Once the accumulated water is collected into the chiller outlet header 34, fresh air outlet header 42, and/or bleed air outlet header 48, the water can be easily drained and removed from heat exchanger assembly 12, thereby eliminating the potential negative effects the accumulated water could have if not removed from heat exchanger assembly 12.

Figure 3A:
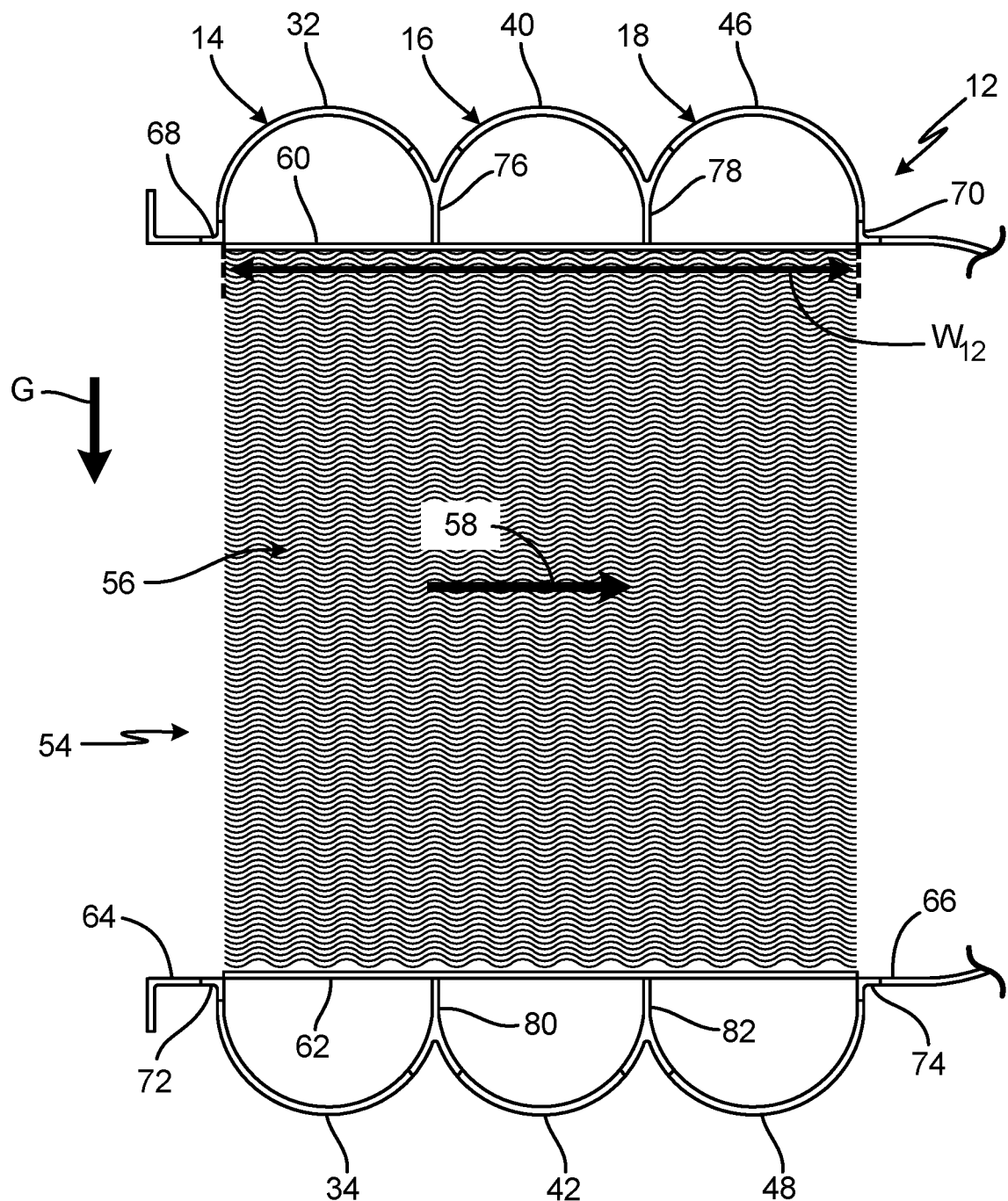
FIG. 3A is a cross-section view of a cold layer of the heat exchanger assembly taken along section line 3A-3A shown in FIG. 2.

FIG. 3A is a cross-section view of cold layer 54 of heat exchanger assembly 12 taken along section line 3A-3A shown in FIG. 2. FIG. 3A shows heat exchanger assembly 12 (with width $W_{12}$), chiller heat exchanger 14 (with chiller inlet header 32 and chiller outlet header 34), fresh air heat exchanger 16 (with fresh air inlet header 40 and fresh air outlet header 42), bleed air heat exchanger 18 (with bleed air inlet header 46 and bleed air outlet header 48), direction G of gravity, cold fins 56, cold air circuit 58, top closure bar 60, bottom closure bar 62, ram air inlet 64, ram air outlet header 66, first top core band 68, second top core band, 70, first bottom core band, 72, second bottom core band 74, first top Y-septum 76, second top Y-septum 78, first bottom Y-septum 80, and second bottom Y-septum 82.

Width $W_{12}$ is a width of heat exchanger assembly 12. Cold layer 54 is a single cross-section layer of heat exchanger assembly 12 that includes cold fins 56 for transfer of thermal energy. Cold fins 56 are wavy sheets of solid material such as metal configured to transfer thermal energy between cold fins 56 and a fluid passing across cold fins 56. Cold air circuit 58 includes a continuous fin allowing ram air to flow through heat exchanger assembly 12, picking up heat rejected by three hot circuits passing through chiller heat exchanger 14, fresh air heat exchanger 16, and bleed air heat exchanger 18. Top closure bar 60 and bottom closure bar 62 are flat, elongated pieces of solid material. Ram air inlet 64 is a fluidic inlet. Ram air outlet header 66 is a fluidic outlet.

First top core band 68, second top core band 70, first bottom core band 72, and second bottom core band 74 are elongated pieces of solid material that include a 90 degree bend cross-section. First top Y-septum 76, second top Y-septum 78, first bottom Y-septum 80, and second bottom Y-septum 82 are elongated pieces of solid material that include a Y-shaped cross-section. In one non-limiting embodiment, any of first top Y-septum 76, second top Y-septum 78, first bottom Y-septum 80, and second bottom Y-septum 82 can be formed by an extrusion process.

Width $W_{12}$ spans across widths of chiller heat exchanger 14, fresh air heat exchanger 16, and bleed air heat exchanger 18. Chiller inlet header 32 is mounted to first top core band 68 and to first top Y-septum 76 with welds. In one non-limiting embodiment, chiller inlet header 32 can be mounted to either first top core band 68 or to first top Y-septum 76 with either a butt weld or a groove weld. Chiller outlet header 34 is mounted to first bottom core band 72 and to first bottom Y-septum 80 with welds. In one non-limiting embodiment, chiller outlet header 34 can be mounted to either first bottom core band 72 or to first bottom Y-septum 80 with either a butt weld or a groove weld.

Fresh air inlet header 40 is mounted to first top Y-septum 76 and to second top Y-septum 78 with welds. In one non-limiting embodiment, fresh air inlet header 40 can be mounted to either first top Y-septum 76 or to second top Y-septum 78 with either a butt weld or a groove weld. Fresh air outlet header 42 is mounted to first bottom Y-septum 80 and to second bottom Y-septum 82 with welds. In one non-limiting embodiment, fresh air outlet header 42 can be mounted to either first bottom Y-septum 80 or to second bottom Y-septum 82 with either a butt weld or a groove weld.

Bleed air inlet header 46 is mounted to second top Y-septum 78 and to second top core band 70 with welds. In one non-limiting embodiment, bleed air inlet header 46 can be mounted to either second top Y-septum 78 or to second top core band 70 with either a butt weld or a groove weld. Bleed air outlet header 48 is mounted to second bottom Y-septum 82 and to second bottom core band 74 with welds. In one non-limiting embodiment, bleed air outlet header 48 can be mounted to either second bottom Y-septum 82 or to second bottom core band 74 with either a butt weld or a groove weld.

Cold layer 54 is one of a plurality of cold layers 54 mounted within heat exchanger assembly 12 in an alternating pattern with a plurality of hot layers. Cold layer 54 is fluidly connected to inlet plenum 28 (not shown in FIG. 3A) via ram air inlet 64 and to FIDH 22 (not shown in FIG. 3A) via ram air outlet header 66. Cold fins 56 are mounted as a part of cold layer 54. Cold fins 56 are in fluid communication with cold air circuit 58. Cold air circuit 58 passes into cold layer 54 through ram air inlet 64, across cold fins 56, and out of cold layer 54 through ram air outlet header 66.

Top closure bar 60 is mounted to cold layer 54 along a top side of cold layer 54 (top as shown in FIG. 3A). Top closure bar 60 is in fluid communication with cold circuit 58. Top closure bar 60 is attached and connected to first top core band 68, second top core band 70, first top Y-septum 76, and second top Y-septum 78. Bottom closure bar 62 is mounted to cold layer 54 along a bottom side of cold layer 54 (bottom as shown in FIG. 3A). Bottom closure bar 62 is in fluid communication with cold circuit 58. Bottom closure bar 62 is attached and connected to first bottom core band 72, second bottom core band 74, first bottom Y-septum 80, and second bottom Y-septum 82.

Ram air inlet 64 is disposed on an upstream, or left side (left as shown in FIG. 3A), of cold layer 54. Ram air inlet 64 is fluidly connected to inlet plenum 28 (not shown in FIG. 3A) and to cold fins 56. Ram air outlet header 66 is disposed on a downstream, or right side (right as shown in FIG. 3A), of cold layer 54. Ram air outlet header 66 is fluidly connected to FIDH 22 (not shown in FIG. 3A) and to cold fins 56.

First top core band 68 is mounted to a top left-hand corner of cold layer 54. First top core band 68 is attached and connected to top closure bar 60 and to a portion of chiller inlet header 32. Second top core band 70 is mounted to a top right-hand corner of cold layer 54. Second top core band 70 is attached and connected to top closure bar 60 and to a portion of bleed air inlet header 46. First bottom core band 72 is mounted to a bottom left-hand corner of cold layer 54. First bottom core band 72 is attached and connected to bottom closure bar 62 and to a portion of chiller outlet header 34. Second bottom core band 74 is mounted to a bottom right-hand corner of cold layer 54. Second bottom core band 74 is attached and connected to bottom closure bar 62 and to a portion of bleed air outlet header 48.

First top Y-septum 76 is attached and connected to chiller inlet header 32, fresh air inlet header 40, and to top closure bar 60. In this non limiting embodiment, first top Y-septum 76 is welded to top closure bar 60 with either a groove weld or two fillet welds. Second top Y-septum 78 is attached and connected to fresh air inlet header 40, bleed air inlet header 46, and to top closure bar 60. In this non limiting embodiment, second top Y-septum 78 is welded to top closure bar 60 with either a groove weld or two fillet welds. First bottom Y-septum 80 is attached and connected to chiller outlet header 34, fresh air outlet header 42, and to bottom closure bar 62. In this non limiting embodiment, first bottom Y-septum 80 is welded to bottom closure bar 62 with either a groove weld or two fillet welds. Second bottom Y-septum 82 is attached and connected to fresh air outlet header 42, bleed air outlet header 48, and to bottom closure bar 62. In this non limiting embodiment, second bottom Y-septum 82 is welded to bottom closure bar 62 with either a groove weld or two fillet welds.

Cold layer 54 receives cold air circuit 58 from inlet plenum 28 and guides cold air circuit across cold fins 56 so as to transfer thermal energy from cold fins 56 into the air of cold air circuit 58. Cold fins 56 transfer thermal energy to the air of cold air circuit 58. Cold air circuit 58 is drawn through cold layer 54 so as to receive thermal energy from cold fins 56 so as to result in a reduction in the amount of thermal energy in cold fins 56. Top closure bar 60 and bottom closure bar 62 provide fluidic barriers for containing cold circuit 58 between top closure bar 60 and bottom closure bar 62 as cold air circuit 58 passes through cold layer 54.

Ram air inlet 64 provides a fluidic inlet through which cold air circuit 58 enters into cold layer 54 and into contact with cold fins 56. Ram air outlet header 66 provides a fluidic outlet through which cold air circuit 58 exits out of cold layer 54. First top core band 68, second top core band 70, first bottom core band 72, and second bottom core band 74 provide structural support for the components of cold layer 54. First top Y-septum 76, second top Y-septum 78, first bottom Y-septum 80, and second bottom Y-septum 82 provide mount points for components of cold layer 54 and of heat exchanger assembly 12. First top Y-septum 76, second top Y-septum 78, first bottom Y-septum 80, and second bottom Y-septum 82 also provide a continued curved surface that is similar to the curved inner surfaces of the inlet and outlet headers of heat exchanger assembly 12.

Cold layer 54 of heat exchanger assembly 12 provides a single continuous ram fin across which cold air circuit 58 flows. In existing configurations, a discontinuous ram fin leads to particulates becoming trapped in the points of discontinuity. With a single continuous ram fin, cold layer 54 is less susceptible to clogging and failure due to particulate blockage. Additionally, the welded interfaces among the components of cold layer of heat exchanger assembly 12 reduced the number of parts as well as width $W_{12}$ and corresponding pack volume of ECS pack 10.

Figure 3B:
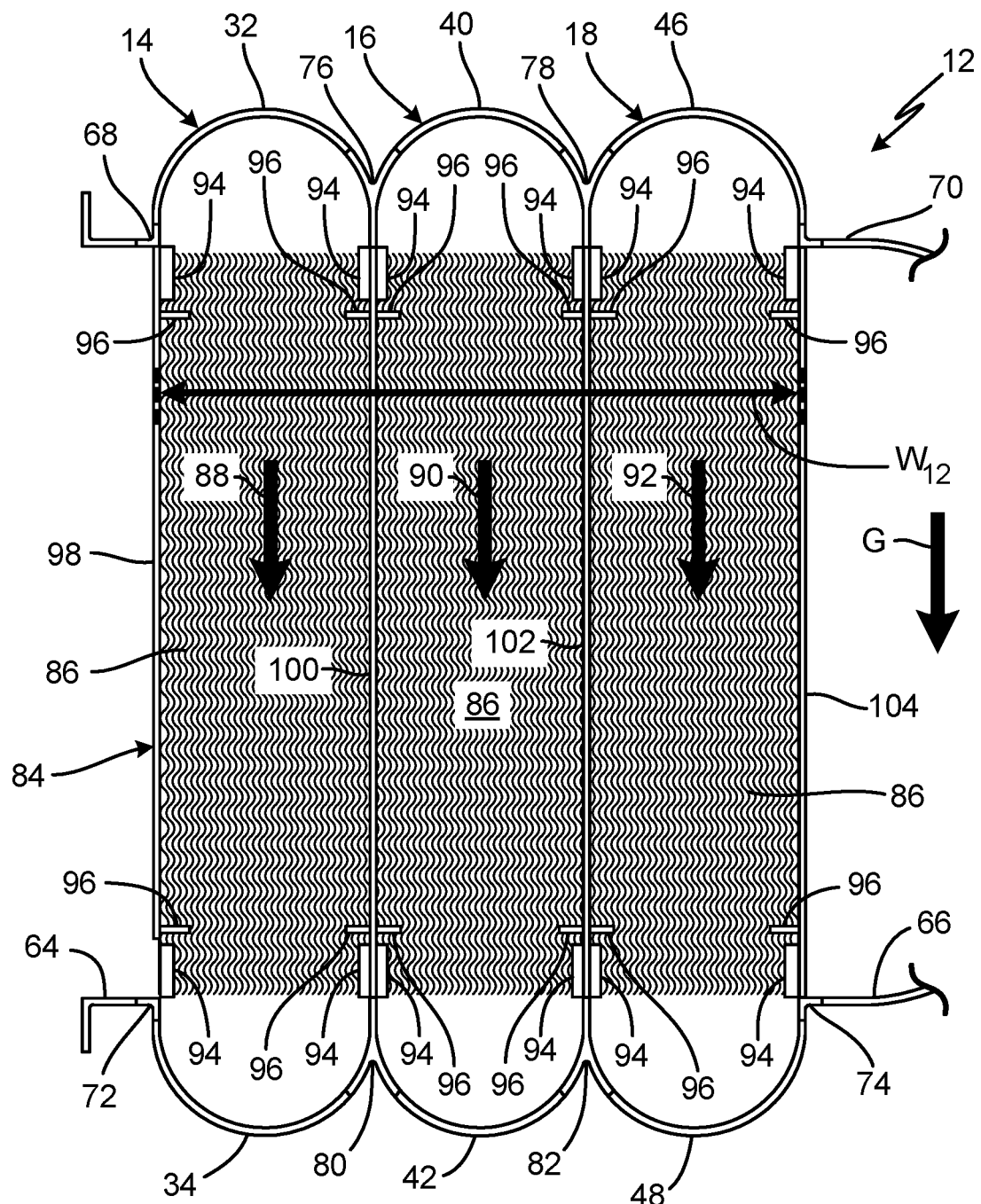
FIG. 3B is a cross-section view of a hot layer of the heat exchanger assembly taken along section line 3B-3B shown in FIG. 2.

FIG. 3B is a cross-section view of hot layer 84 of heat exchanger assembly 12 taken along section line 3B-3B shown in FIG. 2. FIG. 3B shows heat exchanger assembly 12 (with width $W_{12}$), chiller heat exchanger 14 (with chiller inlet header 32 and chiller outlet header 34), fresh air heat exchanger 16 (with fresh air inlet header 40 and fresh air outlet header 42), bleed air heat exchanger 18 (with bleed air inlet header 46 and bleed air outlet header 48), direction G of gravity, ram air inlet 64, ram air outlet header 66, first top core band 68, second top core band, 70, first bottom core band, 72, second bottom core band 74, first top Y-septum 76, second top Y-septum 78, first bottom Y-septum 80, second bottom Y-septum 82, hot layer 84, hot fins 86, chiller air circuit 88, fresh air circuit 90, bleed air circuit 92, reinforcing bars 94, redistribution slots 96, first closure bar 98, second closure bar 100, third closure bar 102, and fourth closure bar 104.

Hot layer 84 is a single cross-section layer of heat exchanger assembly 12 that includes hot fins 86 for transfer of thermal energy. Hot fins 86 are wavy sheets of solid material such as metal configured to transfer thermal energy between hot fins 86 and a fluid passing across hot fins 86. Chiller air circuit 88, fresh air circuit 90, and bleed air circuit 92 are fluidic pathways. Reinforcing bars 94 are bars of solid material. Redistribution slots 96 are rectangular slits or openings. First closure bar 98, second closure bar 100, third closure bar 102, and fourth closure bar 104 are flat, elongated pieces of solid material.

Hot layer 84 is mounted within heat exchanger assembly 12 in an alternating pattern with a plurality of cold layers 54. Hot fins 86 are mounted as a part of hot layer 84 and are in fluid communication with chiller air circuit 88, fresh air circuit 90, and bleed air circuit 92. Hot fins 86 are located in each of chiller heat exchanger 14, fresh air heat exchanger 16, and bleed air heat exchanger 18. Hot fins 86 of chiller heat exchanger 14, fresh air heat exchanger 16, and bleed air heat exchanger 18 are brazed together to form a unitized assembly such that chiller heat exchanger 14, fresh air heat exchanger 16, and bleed air heat exchanger 18 are a single unit without flanges or attachment hardware therebetween.

Chiller air circuit 88 passes into hot layer 84 through chiller inlet header 32, across hot fins 86 of chiller heat exchanger 14, and out of hot layer 84 through chiller outlet header 34. Fresh air circuit 90 passes into hot layer 84 through fresh air inlet header 40, across hot fins 86 of fresh air heat exchanger 16, and out of hot layer 84 through fresh air outlet header 42. Bleed air circuit 92 passes into hot layer 84 through bleed air inlet header 46, across hot fins 86 of bleed air heat exchanger 18, and out of hot layer 84 through bleed air outlet header 48.

Reinforcing bars 94 are disposed within portions of heat exchanger assembly 12 at locations where components of heat exchanger assembly 12 are connected together. Reinforcing bars 94 are mounted to portions of first closure bar 98, second closure bar 100, third closure bar 102, and fourth closure bar 104 at locations adjacent to first top core band 68, second top core band 70, first bottom core band 72, second bottom core band 74, first top Y-septum 76, second top Y-septum 78, first bottom Y-septum 80, and second bottom Y-septum 82. Redistribution slots 96 are disposed in portions of hot fins 86 that are immediately adjacent reinforcing bars 94 along the directions of flow of chiller, fresh, and bleed air circuits 88, 90, and 92.

First top core band 68 and first bottom core band 72 are mounted to first closure bar 98. First closure bar 98 is located to the left of chiller air circuit 88 (to the left as shown in FIG. 3B). First top Y-septum 76 and first bottom Y-septum 80 are mounted to second closure bar 100. Second top Y-septum 78 and to second bottom Y-septum 82 are mounted to third closure bar 102. Second top core band 70 and to second bottom core band 74 are mounted to fourth closure bar 104.

Hot layer 84 receives chiller air circuit 88 from chiller heat exchanger 14, fresh air circuit 90 from fresh air heat exchanger 16, and bleed air circuit 92 from bleed air heat exchanger 18. Hot layer 84 then guides chiller air circuit 88, fresh air circuit 90, and bleed air circuit 92 across hot fins 86 so as to transfer thermal energy from hot fins 86 into the air of chiller air circuit 88, fresh air circuit 90, and bleed air circuit 92. Hot fins 86 transfer thermal energy to the air of chiller air circuit 88, fresh air circuit 90, and bleed air circuit 92.

Chiller air circuit 88, fresh air circuit 90, and bleed air circuit 92 are drawn through hot layer 84 so as to transfer thermal energy to hot fins 86 so as to result in a reduction in the amount of thermal energy in chiller air circuit 88, fresh air circuit 90, and bleed air circuit 92. Also, the directions of chiller air circuit 88, fresh air circuit 90, and bleed air circuit 92 are in the same downward direction as the direction G of gravity to promote condensed water flow in a downward direction.

Reinforcing bars 94 reinforce and provide additional structural support to portions of heat exchanger assembly 12 at locations where components of heat exchanger assembly 12 form connection points. Redistribution slots 96 redistribute or allow portions of chiller air circuit 88, fresh air circuit 90, and bleed air circuit 92 to drop behind reinforcing bars 94 so as to transport portions of chiller air circuit 88, fresh air circuit 90, and bleed air circuit 92 to hot fins 86 that are positioned downstream/upstream of reinforcing bars 94. Without redistribution slots 96, hot fins 86 placed in downstream/upstream alignment with reinforcing bars 94 would not receive any of the flows from chiller air circuit 88, fresh air circuit 90, and bleed air circuit 92 because reinforcing bars 94 would block flow moving in an up to down direction (up and down directions as shown in FIG. 3B).

First closure bar 98 and second closure bar 100 provide fluidic barriers for containing chiller air circuit 88 between first closure bar 98 and second closure bar 100 as chiller air circuit 88 passes through hot layer 84. Third closure bar 102 provides a fluidic barrier for containing fresh air circuit 90 between second closure bar 100 and third closure bar 102 as fresh air circuit 90 passes through hot layer 84. Fourth closure bar 104 provides a fluidic barrier for containing bleed air circuit 92 between third closure bar 102 and fourth closure bar 104 as bleed air circuit 92 passes through hot layer 84.

The unitized configuration of heat exchanger assembly removes interface flanges and associated attachment hardware necessary in existing heat exchanger assemblies without three heat exchangers brazed together to form a single, unitized assembly. The removal of interface flanges and hardware reduces width $W_{12}$ of heat exchanger assembly and reduces the overall weight of heat exchanger 12 and ECS pack 10. Redistribution slots 96 maximize available core channels in hot layer 84 otherwise obstructed by reinforcing bars 94 and fin run out. Orienting the directions of chiller air circuit 88, fresh air circuit 90, and bleed air circuit 92 to be the same direction as direction G of gravity minimizes the risk of condensed water retention within heat exchanger assembly 12.

Figure 4:
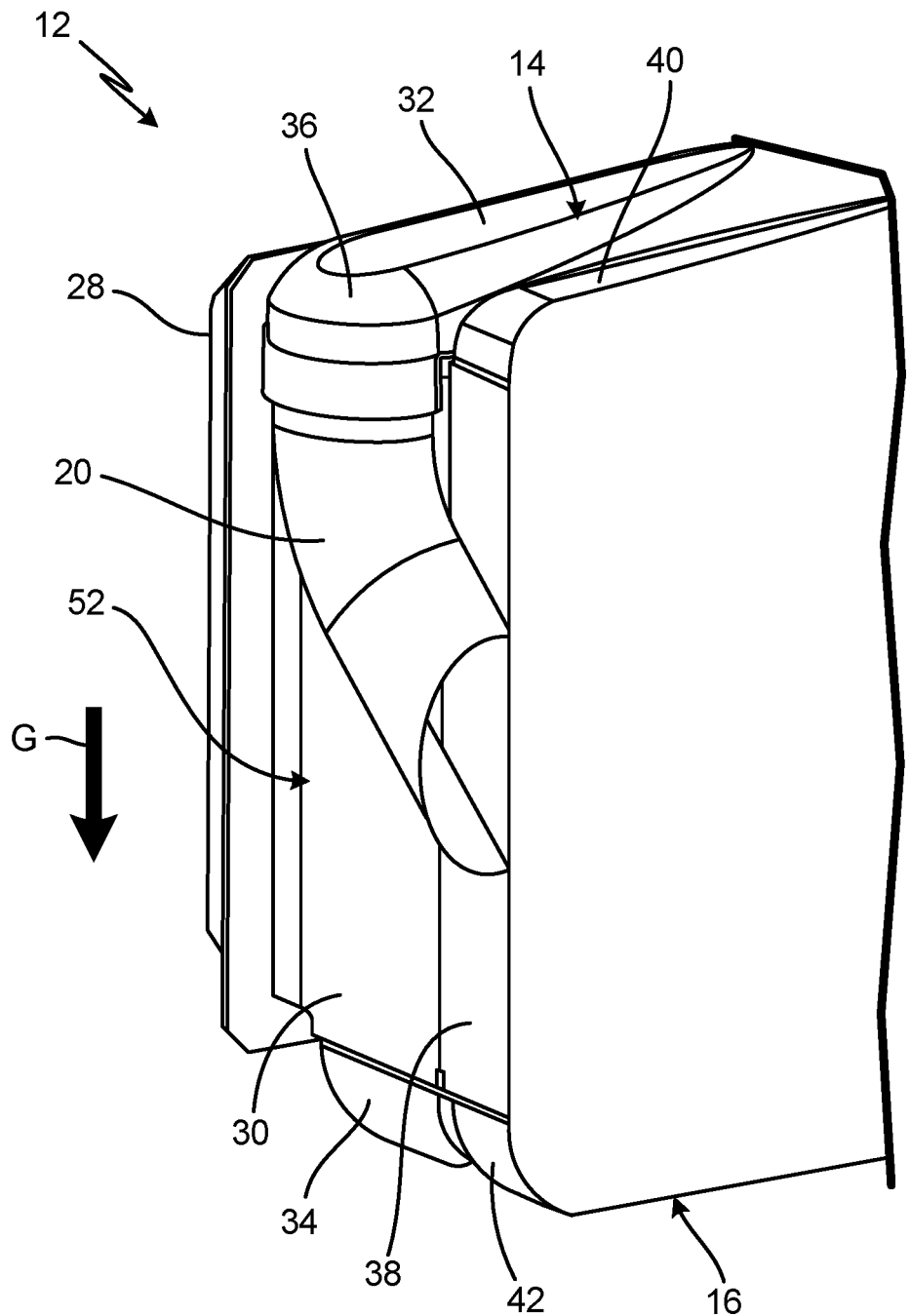
FIG. 4 is cross-section perspective view of a portion of the heat exchanger assembly taken along section line Z-Z shown in FIG. 2.

FIG. 4 is cross-section perspective view of a portion of heat exchanger assembly 12 taken along section line Z-Z shown in FIG. 2 and shows heat exchanger assembly 12, chiller heat exchanger 14 (with chiller endwall 30, chiller inlet header 32, chiller outlet header 34, and chiller endcap 36), fresh air heat exchanger 16 (with fresh air endwall 38, fresh air inlet header 40, and fresh air outlet header 42), external plenum 20, inlet plenum 28, end sheet 52, and direction G of gravity.

In this view, the cross-section shape of external plenum 20 is seen to include a semi-circle. In other non-limiting embodiments, the cross-section shape of external plenum 20 can include other geometries. In this non-limiting embodiment, external plenum 20 is attached to chiller endcap 36 and to end sheet 52 with welds. External plenum 20 fluidly (and/or pneumatically) connects bleed air outlet header 48 (not shown in FIG. 4) to chiller inlet header 32. Bleed air endcap 50 (not shown in FIG. 4) transitions flow from bleed air outlet header 48 (not shown in FIG. 4) to external plenum 20. Chiller endcap 36 transitions the flow from external plenum 20 into Chiller inlet header 32.

Benefits of incorporating external plenum 20 into heat exchanger assembly 12 include minimizing installed system volume, leakage and weight versus and an external duct run as well as eliminating a need for external and/or separable ducting, couplings, flanges and seals. In other non-limiting embodiments, bypass lines can intersect with external plenum 20 to extract bleed outlet air to other parts of ECS pack 10. In other non-limiting embodiments, external plenum 20 can be applied to other heat exchanger configurations such as a dual-heat exchanger, condenser/re-heater assemblies, etc. Other benefits of external plenum 20 include reducing installed pack volume of ECS pack 10; reducing parts count by eliminating separate loose ducting, flanges, seals and couplings; reducing the weight of ECS pack 10; reducing assembly time of ECS pack 10; and improving reliability of ECS pack 10 by reducing the number of seals and potential leakage sources of heat exchanger assembly 12.

Figure 5:
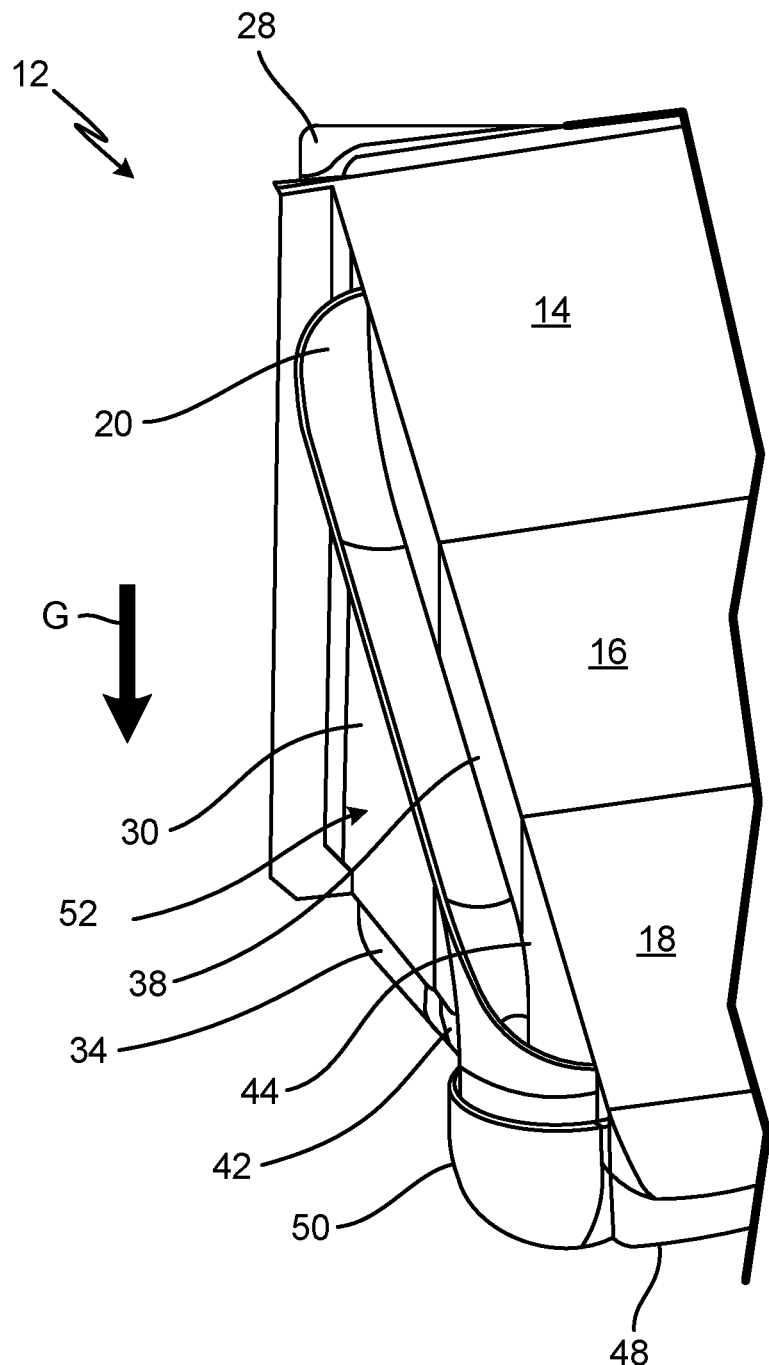
FIG. 5 is cross-section perspective view of a portion of the heat exchanger assembly taken along section line Y-Y shown in FIG. 2.

FIG. 5 is cross-section perspective view of a portion of heat exchanger assembly 12 taken along section line Y-Y shown in FIG. 2 and shows heat exchanger assembly 12, chiller heat exchanger 14 (with chiller endwall 30 and chiller outlet header 34), fresh air heat exchanger 16 (with fresh air endwall 38 and fresh air outlet header 42), bleed air heat exchanger 18 (with bleed air endwall 44, bleed air outlet header 48, and bleed air endcap 50), external plenum 20, inlet plenum 28, end sheet 52, and direction G of gravity. FIG. 5 provides an additional view of the interface between external plenum 20 and end sheet 52. External plenum 20 includes a semi-circular shape with a flat sidewall such that end sheet 52 of the heat exchanger assembly forms the flat sidewall of external plenum 20. In this non-limiting embodiment, external plenum 20 is mounted to end sheet 52 with a fillet weld.

External plenum 20 is attached to end sheet 52 along an entire length of external plenum 20. External plenum 20 and end sheet 52 form a sealed conduit configured to transport a fluid from bleed air outlet header 48 of bleed air heat exchanger 18 to chiller inlet header 32 of the of chiller heat exchanger 14. In addition to transferring air from bleed air outlet header 48 to chiller inlet header 32, external plenum 20 also allows air within external plenum 20 to be in contact with each of chiller endwall 30, fresh air endwall 38, and bleed air endwall 44 which allows thermal energy to be transferred between the air in external plenum 20 and each of chiller endwall 30, fresh air endwall 38, and bleed air endwall 44.

A method of managing a fluid with external plenum 20 of heat exchanger assembly 12 includes inserting air into bleed air heat exchanger 18. The air is drawn out of bleed air heat exchanger 18, through bleed air outlet header 48, and into external plenum 20. The air is passed through external plenum 20. As the air is passed through external plenum 20, the air is passed across and in contact with end sheet 52. The air is drawn into chiller inlet header 32 and is then transferred into chiller heat exchanger 14.

Figure 6A:
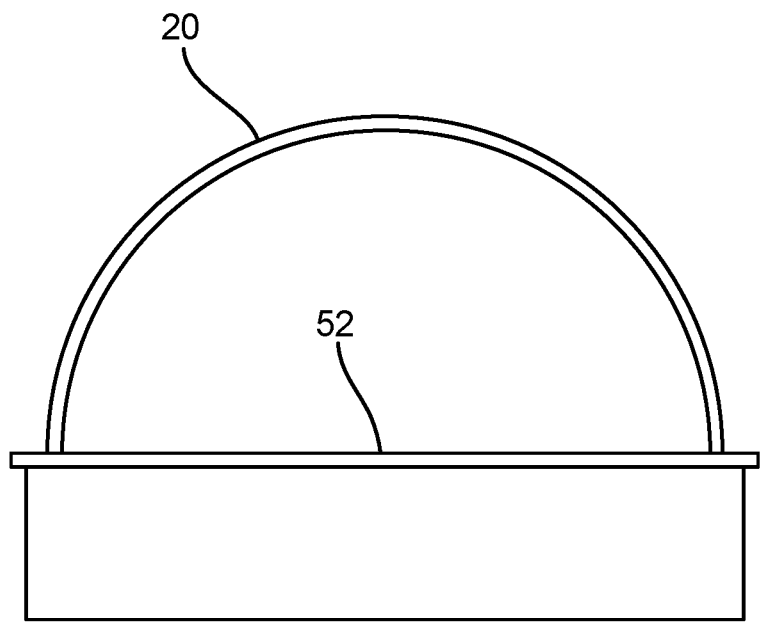
FIG. 6A is a cross-sectional view of the plenum attached to an end sheet of the ECS pack.
Figure 6B:
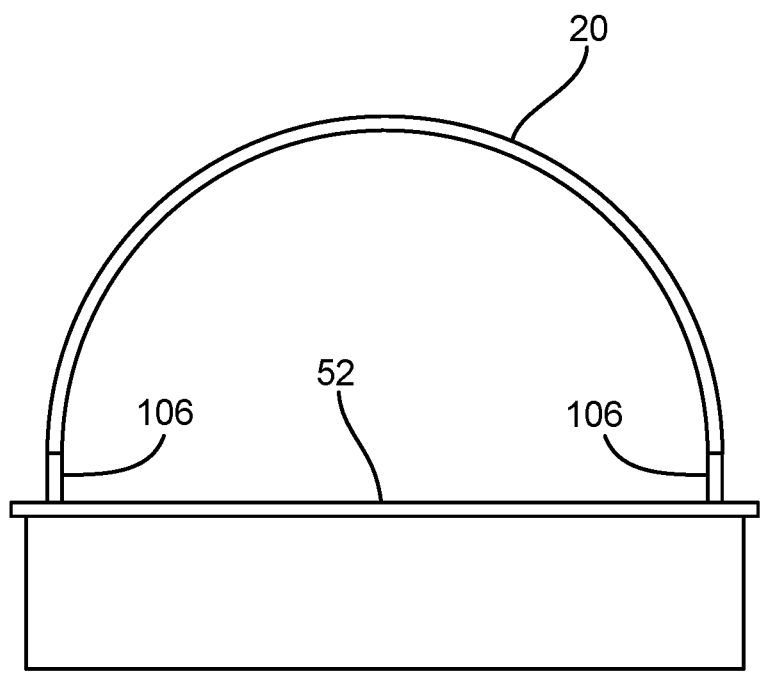
FIG. 6B is a cross-sectional view of the plenum attached to the end sheet of the ECS pack with a core band.

FIG. 6A is a cross-sectional view of external plenum 20 attached to end sheet 52. In this non-limiting embodiment, external plenum 20 is mounted to end sheet 52 with a fillet weld. FIG. 6B is a cross-sectional view of external plenum 20 attached to end sheet 52 with core bands 106. In this non-limiting embodiment, external plenum 20 is mounted to core bands 106 with a fillet weld and with core bands 106 being welded to end sheet 52 with a butt weld. The types of welds used to attach external plenum to end sheet 52 of heat exchanger assembly 12 can be selected based on operational, thermal, and weight parameters of ECS pack 10.

Figure 7A:
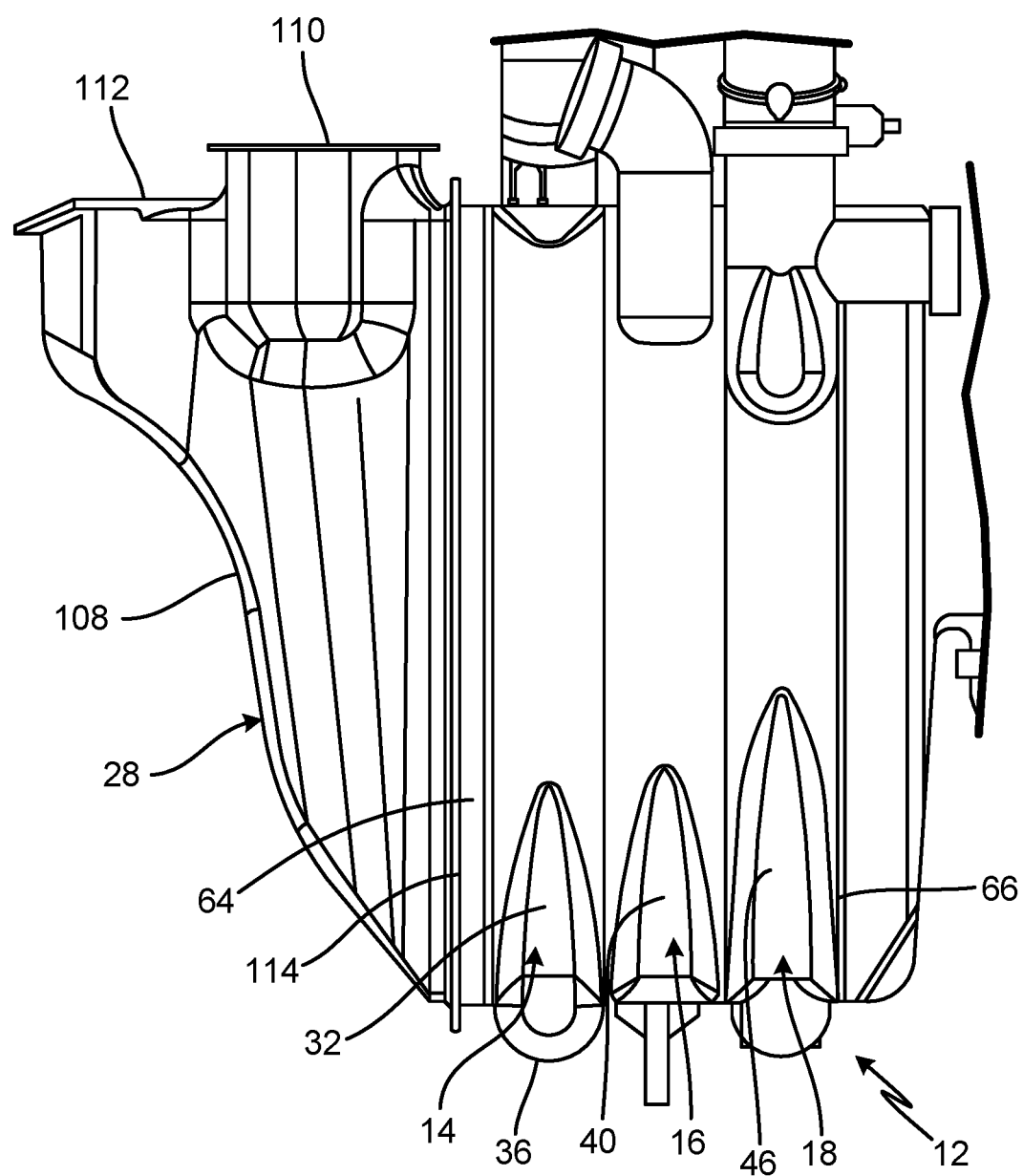
FIG. 7A is a plan view of the inlet plenum and the heat exchanger assembly.

FIG. 7A is a plan view of inlet plenum 28 attached to heat exchanger assembly 12 and shows heat exchanger assembly 12, chiller heat exchanger 14 (with chiller inlet header 32 and chiller endcap 36), fresh air heat exchanger 16 (with fresh air inlet header 40), bleed air heat exchanger 18 (with bleed air inlet header 46), inlet plenum 28 (with housing 108, first inlet 110, second inlet 112, and outlet 114), ram air inlet 64, and ram air outlet header 66. In this non-limiting embodiment, FIG. 7A includes an embodiment of heat exchanger assembly 12 without external plenum 20.

Housing 108 is a container with walls of solid material. In one non-limiting embodiment, housing 108 can include a metallic, molded or composite construction. First inlet 110 and second inlet 112 are fluidic inlets or apertures. Outlet 114 is a fluidic outlet or aperture. Outlet 114 includes a picture frame flange. Housing 108 is mounted to chiller heat exchanger 14 via a flanged interface. First inlet 110 and second inlet 112 are disposed in a portion of inlet plenum 28. First inlet 110 and second inlet 112 are fluidly connected to outlet 114 via housing 108. First inlet 110 is fluidly connected to an exhaust of the power turbine (not shown) of ECS pack 10. Second inlet is fluidly connected to a source of ram air such as a NACA (U.S. National Advisory Committee for Aeronautics) scoop. Outlet 114 is fluidly connected to ram air inlet 64 of heat exchanger assembly 12.

Housing 108 is configured to direct a mixed air stream of air sources from both first inlet 110 and second inlet 112 to outlet 114 and to ram air inlet 64 of heat exchanger assembly 12. First inlet 110 provides a first source of cool air to housing 108 of inlet plenum 28. Second inlet 112 provides a second source of cool air to housing 108 of inlet plenum 28. Outlet 114 directs the mixed air stream from housing 108 to ram air inlet 64 of heat exchanger assembly 12.

Inlet plenum 28 of ECS pack 10 provides two independent cooling streams that are joined at a common plenum to be fed into heat exchanger assembly 12. Additionally, the contoured geometry of housing 108 of inlet plenum 28 is optimized so as to aid in directing a flow of air across a face of ram air inlet 64 of heat exchanger assembly 12.

FIG. 7B is an end view of inlet plenum 28 attached to heat exchanger assembly 12 and shows heat exchanger assembly 12, chiller heat exchanger 14 (with chiller inlet header 32 and chiller endcap 36), fresh air heat exchanger 16 (with fresh air inlet header 40), bleed air heat exchanger 18 (with bleed air inlet header 46), inlet plenum 28 (with first inlet 110, second inlet 112, outlet 114, access panel 116, and gasket 118), ram air inlet 64, and ram air outlet header 66.

In this non-limiting embodiment, FIG. 7B includes an embodiment of heat exchanger assembly 12 without external plenum 20.

Access panel 116 is a detachable door. Gasket 118 is a seal. Access panel 116 is mounted in a portion of housing 108 of inlet plenum 28. Access panel 116 is located in an opening in housing 108. Access panel 116 can be removable from housing 108, or otherwise attached so as to be fully or partially removed from the opening. Gasket 118 is mounted along an edge of access panel 116. Access panel 116 provides accessibility into housing 108. Gasket 118 provides a fluidic seal between housing 108 and access panel 116. Access panel 116 allows a user to access the inside of housing 108 to remove foreign object debris from housing 108 or from portions of ram air inlet 64 of heat exchanger assembly 12.

Figure 8B:
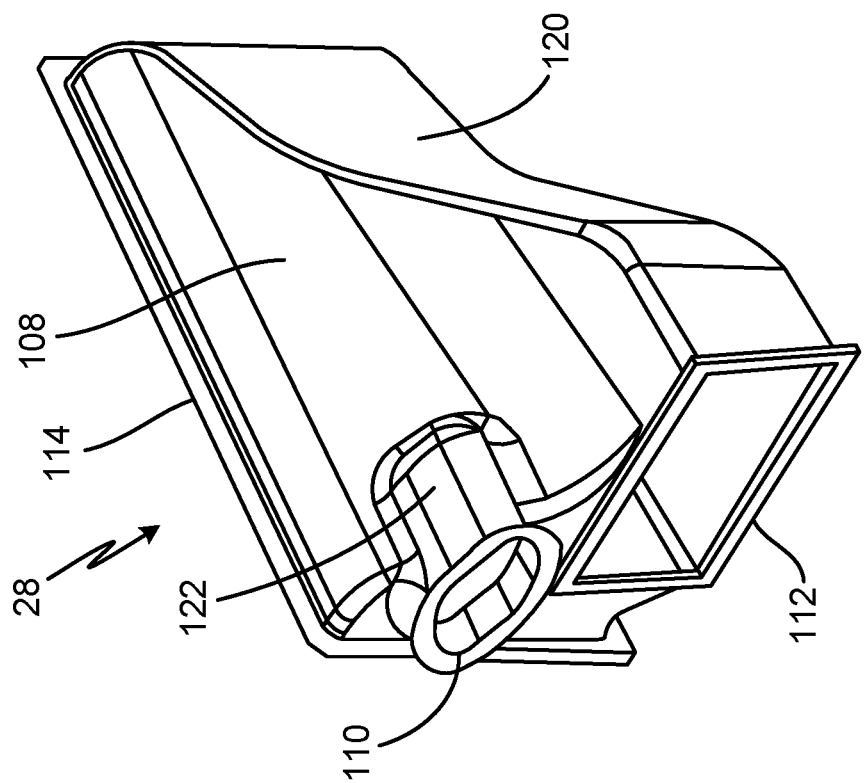
FIG. 8B is another perspective view of the inlet plenum of the ECS pack.
Figure 8A:
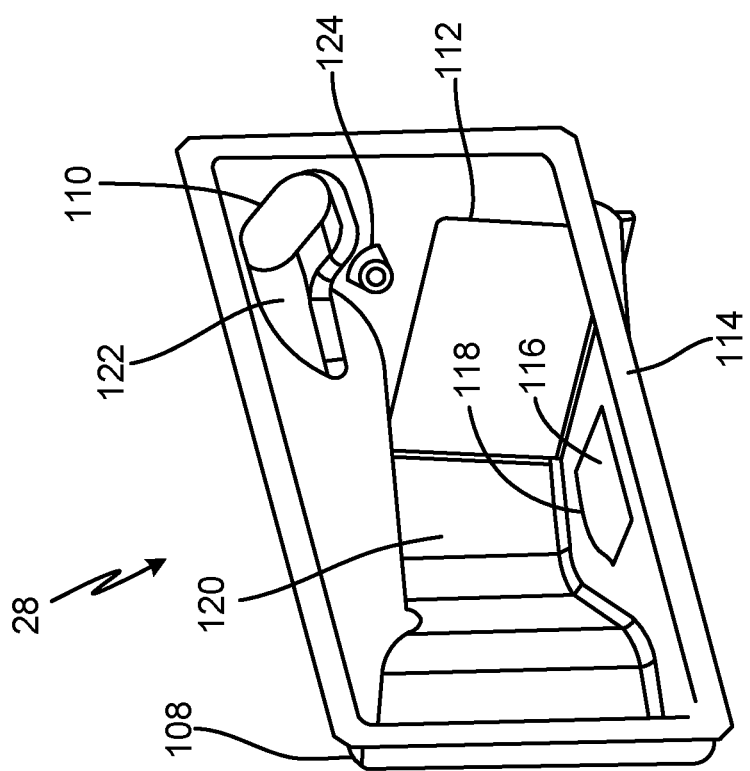
FIG. 8A is a perspective view of the inlet plenum of the ECS pack.

FIG. 8A is a perspective view of inlet plenum 28 of ECS pack 10 and shows inlet plenum 28, first inlet 110, second inlet 112, outlet 114, access panel 116, gasket 118, sidewall 120, inlet feature 122, and nozzle 124. FIG. 8B is another perspective view of inlet plenum 28 of ECS pack 10 and shows inlet plenum 28, first inlet 110, second inlet 112, outlet 114, sidewall 120, and inlet feature 122. FIGS. 8A and 8B show the same or similar elements and will be discussed in unison.

Sidewall 120 is a tapered wall of housing 108. Inlet feature 122 is a curved or cupped portion of housing 108. A cross-sectional shape of inlet feature 122 includes a partially circular or partially elliptical shape. Nozzle 124 is a spout configured to spray a fluid. In this non-limiting embodiment, housing 108 includes a single nozzle 124. In other non-limiting embodiment, housing 108 can include more than one nozzle 124. Sidewall 120 is mounted to a side of housing 108. Inlet feature 122 is formed in a portion of housing 108. Nozzle 124 is mounted inside of housing 108.

A contour and shape of sidewall 120 is configured to combine a first stream of air from first inlet 110 and a second stream of air from second inlet 112 into a mixed air stream. The contour and shape of sidewall 120 is also configured to direct the mixed air stream towards outlet 114 and into ram air inlet 64 of heat exchanger assembly 12 by turning the mixed air stream. Inlet feature 122 is configured to direct the first stream of air from first inlet 110 towards a forward end of heat exchanger assembly 12. Nozzle 124 is configured to disperse water from a water extractor of ECS pack 10 into air passing through the inlet plenum.

Inlet feature 122 directs the first stream of air to a portion of outlet 114 that enhances the cooling effects of the mixed air stream exiting housing 108 and that flows into heat exchanger assembly 12. Fluid sprayed from nozzle 124 provides addition thermal energy transfer to enhance system cooling performance of heat ECS pack 10. The location of nozzle 124 within housing 108 can be adjusted so as to optimize the cooling effects of fluid dispensed from nozzle 124.

Discussion of Possible Embodiments

The following are non-exclusive descriptions of possible embodiments of the present invention.

An environmental control system assembly for an aircraft includes a heat exchanger assembly and a plenum. The heat exchanger assembly includes a first heat exchanger in fluid communication with a source of bleed air from the engine, a second heat exchanger disposed adjacent to the first heat exchanger, a third heat exchanger disposed adjacent to the second heat exchanger, and an end sheet disposed along an end of the heat exchanger assembly. The first heat exchanger includes a first endwall, a first inlet header, a first outlet header connected to the first endwall, and a first endcap located on the first outlet header. The second heat exchanger includes a second endwall. The third heat exchanger includes a third endwall, a third inlet header connected to the third endwall, a third outlet header, and a third endcap located on the third inlet header. The end sheet includes the first, second, and third endwalls. The plenum fluidly connects the first outlet header of the first heat exchanger to the third inlet header of the third heat exchanger.

The environmental control system assembly of the preceding paragraph can optionally include, additionally and/or alternatively, any one or more of the following features, configurations and/or additional components.

The first heat exchanger can comprise of a bleed air heat exchanger, wherein the second heat exchanger can comprise of a fresh air heat exchanger, and/or wherein the third heat exchanger can comprise of a chiller heat exchanger.

The chiller, fresh air, and/or bleed air heat exchangers can be brazed together to form a single unitized tri-heat exchanger.

The plenum and the end sheet can form a sealed conduit configured to transport a fluid from the first outlet header of the first heat exchanger to the third inlet header of the third heat exchanger.

The plenum can comprise a semi-circular shape with a flat sidewall, wherein the end sheet of the heat exchanger assembly can form the flat sidewall of the plenum.

The plenum can be mounted to the end sheet of the heat exchanger with a fillet weld.

A core band can be disposed between the plenum and the end sheet, wherein the core band can be mounted to the end sheet with a fillet weld, and wherein the plenum can be mounted to the core band with a butt weld.

The first outlet header can be disposed on a bottom end of the first endwall relative to the direction of gravity, and/or wherein the third inlet header can be disposed on a top end of the third endwall relative to the direction of gravity.

A method of managing a fluid with a heat exchanger assembly includes passing air into a bleed air heat exchanger of the heat exchanger assembly. The air is drawn out of the bleed air heat exchanger, through an outlet header of the bleed air heat exchanger, and into a plenum. The outlet header of the bleed air heat exchanger fluidly connects the bleed air heat exchanger to the plenum. The plenum is attached to an end sheet of the heat exchanger assembly along an entire length of the plenum. The air is passed through the plenum. The air is drawn from the plenum, through an inlet header of a chiller heat exchanger, and into the chiller heat exchanger. The inlet header of the chiller heat exchanger fluidly connects the plenum to the chiller heat exchanger.

The method of the preceding paragraph can optionally include, additionally and/or alternatively, any one or more of the following steps, features, configurations and/or additional components.

The air can be passed across and/or in contact with the end sheet of the heat exchanger assembly.

Thermal energy can be transferred between the air passing through the plenum and the end sheet.

The air can be passed through the chiller heat exchanger in a direction that can be parallel to a relative direction of gravity.

The air can be passed through the bleed air heat exchanger in a direction that can be parallel to a relative direction of gravity.

An environmental control system includes a heat exchanger assembly, an end sheet, and a semi-circular plenum welded along its length to the end sheet. The heat exchanger assembly includes a chiller heat exchanger, a fresh air heat exchanger, and a bleed air heat exchanger. The chiller heat exchanger includes a chiller endwall, a chiller inlet header mounted on the top of the chiller heat exchanger, a chiller outlet header mounted on the bottom of the chiller heat exchanger, and a chiller endcap attached and in fluid communication with the chiller inlet header. The fresh air heat exchanger is mounted adjacent to the chiller heat exchanger. The fresh air heat exchanger includes a fresh air endwall. A fresh air inlet header is mounted on the top of the fresh air heat exchanger, and a fresh air outlet header mounted on the bottom of the fresh air heat exchanger. The bleed air heat exchanger is mounted adjacent to the fresh air heat exchanger. The bleed air heat exchanger includes a bleed air endwall, a bleed air inlet header mounted on the top of the bleed air heat exchanger, a bleed air outlet header mounted on the bottom of the bleed air heat exchanger, and a bleed air endcap attached and in fluid communication with the bleed air inlet header. The end sheet includes the chiller, fresh air, and bleed air endwalls. The semi-circular plenum fluidly connects the bleed air outlet header to the chiller inlet header.

The environmental control system assembly of the preceding paragraph can optionally include, additionally and/or alternatively, any one or more of the following features, configurations and/or additional components.

The chiller, fresh air, and/or bleed air heat exchangers can be brazed together to form a single unitized tri-heat exchanger.

The semi-circular plenum and the end sheet can form a sealed conduit configured to transport a fluid from the bleed air outlet header of the bleed air heat exchanger to the chiller inlet header of the chiller heat exchanger.

The end sheet of the heat exchanger assembly can form a flat sidewall of the semi-circular plenum.

The bleed air outlet header is disposed on a bottom end of the bleed air endwall relative to a direction of gravity, and wherein the chiller inlet header is disposed on a top end of the chiller endwall relative to the direction of gravity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental control system assembly for an aircraft, the environmental control system assembly comprising:
    a heat exchanger assembly comprising:
        a first heat exchanger in fluid communication with a source of bleed air from an engine of the aircraft, wherein the first heat exchanger comprises:
            a first endwall;
            a first inlet header;
            a first outlet header connected to the first endwall; and
            a first endcap located on the first outlet header;
        a second heat exchanger disposed adjacent to the first heat exchanger, wherein the second heat exchanger comprises:
            a second endwall;
        a third heat exchanger disposed adjacent to the second heat exchanger, wherein the third heat exchanger comprises:
            a third endwall;
            a third inlet header connected to the third endwall;
            a third outlet header; and
            a third endcap located on the third inlet header;
        an end sheet disposed along an end of the heat exchanger assembly, wherein the end sheet comprises the first, second, and third endwalls; and
    a plenum attached to the end sheet along a length of the plenum, wherein the plenum fluidly connects the first outlet header of the first heat exchanger to the third inlet header of the third heat exchanger, wherein the plenum and the end sheet form a sealed conduit configured to transport a fluid from the first outlet header of the first heat exchanger to the third inlet header of the third heat exchanger.

2. The environmental control system assembly of claim 1, wherein the first heat exchanger comprises a bleed air heat exchanger, wherein the second heat exchanger comprises a fresh air heat exchanger, and wherein the third heat exchanger comprises a chiller heat exchanger.

3. The environmental control system assembly of claim 2, wherein the chiller, fresh air, and bleed air heat exchangers are brazed together to form a single unitized tri-heat exchanger.

4. The environmental control system assembly of claim 1, wherein the plenum comprises a semi-circular shape with a flat sidewall, wherein the end sheet of the heat exchanger assembly forms the flat sidewall of the plenum.

5. The environmental control system assembly of claim 1, wherein the plenum is mounted to the end sheet of the heat exchanger assembly with a fillet weld.

6. The environmental control system assembly of claim 1, further comprising a core band disposed between the plenum and the end sheet, wherein the core band is mounted to the end sheet with a fillet weld, and wherein the plenum is mounted to the core band with a butt weld.

7. The environmental control system assembly of claim 1, wherein the first outlet header is disposed on a bottom end of the first endwall relative to a direction of gravity, and wherein the third inlet header is disposed on a top end of the third endwall relative to the direction of gravity.

8. A method of managing a fluid with a heat exchanger assembly, the method comprising:
    passing air into a bleed air heat exchanger of the heat exchanger assembly;
    drawing the air out of the bleed air heat exchanger, through an outlet header of the bleed air heat exchanger, and into a plenum, wherein the outlet header of the bleed air heat exchanger fluidly connects the bleed air heat exchanger to the plenum, and wherein the plenum is attached to an end sheet of the heat exchanger assembly along an entire length of the plenum;
    passing the air through the plenum; and
    drawing the air from the plenum, through an inlet header of a chiller heat exchanger, and into the chiller heat exchanger, wherein the inlet header of the chiller heat exchanger fluidly connects the plenum to the chiller heat exchanger.

9. The method of claim 8, wherein passing the air through the plenum further comprises passing the air across and in contact with the end sheet of the heat exchanger assembly.

10. The method of claim 8, wherein passing the air through the plenum further comprises transferring thermal energy between the air passing through the plenum and the end sheet.

11. The method of claim 8, further comprising passing the air through the chiller heat exchanger in a direction that is parallel to a relative direction of gravity.

12. The method of claim 8, wherein passing the air into the bleed air heat exchanger further comprises passing the air through the bleed air heat exchanger in a direction that is parallel to a relative direction of gravity.

13. An environmental control system comprising:
   a heat exchanger assembly comprising:
      a chiller heat exchanger comprising:
         a chiller endwall;
         a chiller inlet header mounted on a top of the chiller heat exchanger;
         a chiller outlet header mounted on a bottom of the chiller heat exchanger; and
         a chiller endcap attached and in fluid communication with the chiller inlet header;
      a fresh air heat exchanger mounted adjacent to the chiller heat exchanger, wherein the fresh air heat exchanger comprises:
         a fresh air endwall;
         a fresh air inlet header mounted on a top of the fresh air heat exchanger; and
         a fresh air outlet header mounted on a bottom of the fresh air heat exchanger;
      a bleed air heat exchanger mounted adjacent to the fresh air heat exchanger, wherein the bleed air heat exchanger comprises:
         a bleed air endwall;
         a bleed air inlet header mounted on a top of the bleed air heat exchanger;
         a bleed air outlet header mounted on a bottom of the bleed air heat exchanger; and
         a bleed air endcap attached and in fluid communication with the bleed air inlet header;
   an end sheet comprising the chiller, fresh air, and bleed air end walls; and
   a semi-circular plenum welded along its length to the end sheet, wherein the semi-circular plenum fluidly connects the bleed air outlet header to the chiller inlet header.

14. The environmental control system assembly of claim 13, wherein the chiller, fresh air, and bleed air heat exchangers are brazed together to form a single unitized tri-heat exchanger.

15. The environmental control system assembly of claim 13, wherein the semi-circular plenum and the end sheet form a sealed conduit configured to transport a fluid from the bleed air outlet header of the bleed air heat exchanger to the chiller inlet header of the chiller heat exchanger.

16. The environmental control system assembly of claim 13, wherein the end sheet of the heat exchanger assembly forms a flat sidewall of the semi-circular plenum.

17. The environmental control system assembly of claim 13, wherein the bleed air outlet header is disposed on a bottom end of the bleed air endwall relative to a direction of gravity, and wherein the chiller inlet header is disposed on a top end of the chiller endwall relative to the direction of gravity.

* * * * *